(12) United States Patent
Sakurai et al.

(10) Patent No.: US 6,860,466 B2
(45) Date of Patent: Mar. 1, 2005

(54) THROTTLE DEVICES HAVING MOTORS SUPPORTED BY ELASTIC, METALLIC SUPPORT MEMBERS

(75) Inventors: Toru Sakurai, Obu (JP); Tsutomu Nishitani, Obu (JP); Sunao Kitamura, Obu (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 144 days.

(21) Appl. No.: 10/143,888

(22) Filed: May 14, 2002

(65) Prior Publication Data

US 2002/0171059 A1 Nov. 21, 2002

(30) Foreign Application Priority Data

May 15, 2001 (JP) ........................................ 2001-145025

(51) Int. Cl.[7] ............................................... F16K 31/02
(52) U.S. Cl. ..................... 251/129.11; 251/305; 310/91
(58) Field of Search .......................... 310/91; 251/305, 251/129.11, 129.12, 129.13, 306, 307, 308

(56) References Cited

U.S. PATENT DOCUMENTS

| | | | | |
|---|---|---|---|---|
| 3,179,058 A | * | 4/1965 | Meagher ..................... | 417/360 |
| 3,604,820 A | * | 9/1971 | Scheller et al. ............... | 310/91 |
| 4,181,472 A | * | 1/1980 | Sharp .......................... | 310/91 |
| 4,480,614 A | * | 11/1984 | Kobashi et al. ......... | 251/129.12 |
| 4,976,237 A | * | 12/1990 | Bollinger ............... | 251/129.11 |
| 4,988,074 A | * | 1/1991 | Najmolhoda ........... | 251/129.08 |
| 5,508,577 A | * | 4/1996 | Shiga et al. .................. | 310/91 |
| 5,901,761 A | * | 5/1999 | Rutter et al. ............. | 251/149.6 |
| 6,000,377 A | * | 12/1999 | Sato et al. ................... | 123/337 |
| 6,067,958 A | * | 5/2000 | Kamimura et al. ......... | 123/337 |
| 6,098,594 A | * | 8/2000 | Kowatari et al. ........... | 123/399 |
| 6,473,958 B2 | * | 11/2002 | Miyoshi et al. ........ | 251/129.11 |
| 6,474,572 B1 | * | 11/2002 | Tsuchiya et al. ....... | 251/129.21 |
| 6,489,699 B2 | * | 12/2002 | Hioki et al. .................. | 310/91 |

FOREIGN PATENT DOCUMENTS

JP          5-180006          7/1993

* cited by examiner

Primary Examiner—John Bastianelli
(74) Attorney, Agent, or Firm—Dennison, Schultz, Dougherty & MacDonald

(57) ABSTRACT

A throttle device with a throttle body and first and second supports supporting a motor for controlling the opening position of the throttle of a valve. The first and second supports support the motor from both sides of the motor in the longitudinal direction. At least one of the first and second supports may also elastically support the motor, and may be a metallic leaf spring disposed within the throttle body.

15 Claims, 5 Drawing Sheets

THROTTLE DEVICES HAVING MOTORS SUPPORTED BY ELASTIC, METALLIC SUPPORT MEMBERS

This application claims priority to Japanese application serial number 2001-145025, which application is hereby incorporated by reference herein in its entirety.

BACKGROUND OF THE INVENTION

1. Field of the Invention

The present invention relates to throttle devices and control devices for controlling the opening and closing of a throttle valve. For example, such throttle valves may be utilized to control the amount of air that is supplied to an engine, such as an automobile engine. More particularly, the present invention relates to throttle devices having a motor for driving the throttle valve, the motor being resiliently and elastically supported within the throttle body.

2. Description of the Related Art

Japanese Laid-open Patent Publication No. 5-180006 generally discloses a known throttle device that includes a throttle body, a throttle valve and a motor. The throttle body defines an air intake passage and the throttle valve is disposed within the air intake passage. The motor serves to drive the throttle valve so as to open and close the air intake passage. As a result, the flow of the intake air into the intake passage may be controlled in response to the degree of opening of the throttle valve.

In such a throttle device, the throttle body supports the motor in a cantilever manner at only one end of the motor in the longitudinal direction. Therefore, when vibrations from the engine are transmitted to the motor, the motor may be prone to vibrate along the diametrical direction. Therefore, known throttle devices have been known to generate undesired noises due to motor vibration.

SUMMARY OF THE INVENTION

Therefore, one object of the present teachings is to provide improved throttle devices that have improved supports for preventing motor vibration.

In one of the aspect of the present teachings, throttle devices are taught that may include a throttle body. A first support and a second support may be disposed within the throttle body (or a motor case defined within the throttle body) and preferably support a motor along the longitudinal direction of the motor. The motor may be coupled to a throttle valve and the motor may control the opening position of the throttle valve with respect to an air intake passage defined within the throttle body. Preferably, at least one of the first and second supports is made from an elastic material. In this case, it is possible to prevent or substantially reduce motor vibration along the diametrical direction of the motor.

In addition or in the alternative, at least one of the first and second supports may be made of material that has relatively high heat conductivity, such as a metallic material. In this case, heat generated by the motor during operation may be reliably conducted or transferred to the throttle body and then may be dissipated to the outside environment. Therefore, the motor may be reliably cooled during operation and prevented from failing due to overheating.

According to another aspect of the present teachings, at least one of the first and second support may be a spring, such as a leaf spring. Therefore, any vibrations transmitted from an outside vibration source, e.g. an automobile engine, to the motor may be dampened by the spring. Thus, in this aspect, the motor can be further prevented from vibrating during operation. In addition, if a metallic leaf spring is utilized as the first and/or second support, the vibration properties of the metallic leaf spring preferably will not be degraded due to motor heat, thereby further preventing motor vibrations during operation. Furthermore, heat from the motor may be reliably conducted or transferred to the outside environment in order to effectively cool the motor during operation.

According to another aspect of the present teachings, the first and/or second support may be configured as a substantially flat plate that extends in a diametrical direction from the motor when the motor is mounted within the throttle body. Therefore, the first and/or second support may have a relatively great or high rigidity along the diametrical direction of the motor and may occupy a relatively small space within the throttle body along the axial direction of the motor.

According to another aspect of the present teachings, the first support and/or second support may include a fitting portion that is arranged and constructed to resiliently bend so as to be fitted onto an end portion of the motor. Therefore, the first support and/or second support may reliably support the end portion of the motor.

Additional objects, features and advantages of the present invention will be readily understood after reading the following detailed description together with the accompanying drawings and the claims.

DETAILED DESCRIPTION OF THE INVENTION

Figure 1:
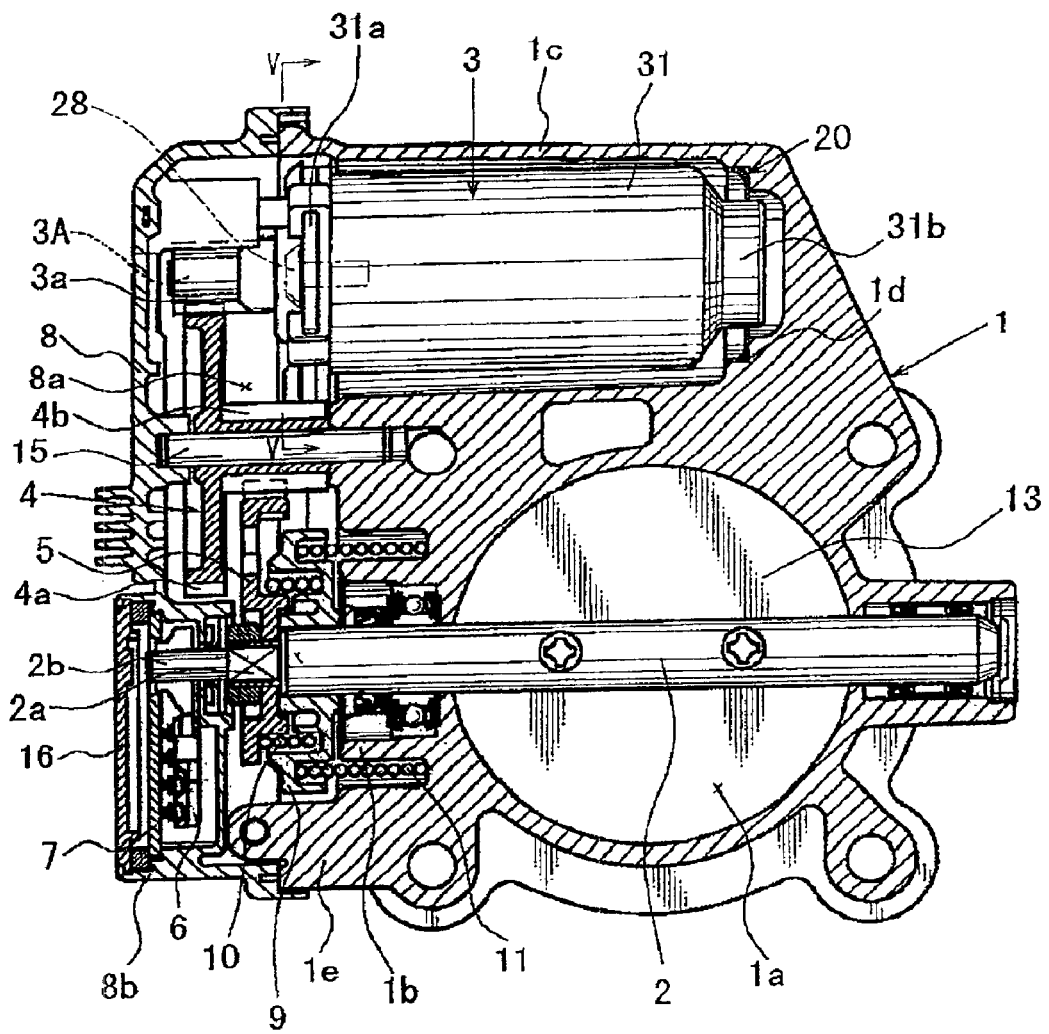
FIG. 1 is a cross-sectional view of a representative throttle device.

In one embodiment of the present teachings, a throttle device may include a throttle body that defines an air intake passage. A throttle valve may be disposed so as to open and close the air intake passage. A motor may rotatably drive the throttle valve and the motor may have a longitudinal axis. A first support may support a first side of the motor along the longitudinal direction of the motor. A second support may support a second side of the motor along the longitudinal direction of the motor. Consequently, the motor may be supported from both sides along the longitudinal direction of the motor. Due to this arrangement, vibrations along the diametrical direction of the motor relative to the throttle body can be reduced. Optionally, at least the first support may support the motor such that the motor cannot move both along its longitudinal direction and its diametrical direction.

In another embodiment of the present teachings, the second support may be made of material that has relatively high heat conductivity. For example, the second support may comprise or may be made of a metal or metal material, such as iron and/or copper. In this case, heat generated by the motor may be quickly conducted or transferred to the throttle body via the second support and then may be dissipated to the outside environment, thereby preventing the motor from overheating.

In another embodiment of the present teachings, the second support may be a spring, such as a leaf spring. In this case, vibrations from an engine, such as an automobile engine, may be dampened by the spring, thereby reducing or preventing undesirable noised caused by motor vibration.

In another embodiment of the present teachings, the second support may be made from SK 5 (spring steel) or SUS (stainless steel). Such metallic materials preferably provide relatively high heat conductivity.

In another embodiment of the present teachings, the support member may be configured as a flat plate or substantially flat plate. For example, the flat plate may be configured as a ring having a first fitting portion and a second fitting portion that are respectively formed on an inner periphery and an outer periphery of the ring. The first fitting portion may be fitted onto the motor. The second fitting portion may be fitted within the throttle body.

Optionally, the first fitting portion may include notches formed at predetermined (and/or regular) intervals along the inner periphery of the ring. The diameter of the inner periphery may be slightly smaller than the diameter of the portion of the motor that is supported by the first fitting portion. In this case, the first fitting portion may be resiliently fitted onto the motor in order to reliably support the motor.

In addition or in the alternative, the second fitting portion may be bent so as to have an annular configuration with a circumferential wall. In this case, the second fitting portion can be fitted within the throttle body and the circumferential wall of the second fitting portion may be pressed against an inner wall of the throttle body. In this case, the second support may be reliably fixed in position relative to the throttle body.

In another embodiment of the present teachings, the second fitting portion may include a plurality of projections. The projections may be disposed at predetermined (and/or regular) intervals along the circumferential direction (periphery of the second fitting portion). Further, the projections may extend in the radial direction of the second support. When the second support is disposed within the throttle body, the projections may resiliently bent in the axial direction of the motor so as to press against the inner wall of the throttle body.

Each of the additional features and teachings disclosed above and below may be utilized separately or in conjunction with other features and teachings to provide improved throttle devices and methods for designing and using such throttle devices. Representative examples of the present invention, which examples utilize many of these additional features and teachings both separately and in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

A first representative throttle device is shown in cross section in FIG. 1 and may include a throttle body 1. A substantially cylindrical air intake passage 1a may be defined within the throttle body 1. Preferably, the throttle body 1 may be made of metal, such as a die-cast aluminum. A throttle shaft 2 may be rotatably disposed within the throttle body 1 and may extend through the air intake passage 1a in the diametrical direction. The throttle body 1 may rotatably support both ends of the throttle shaft 2.

A substantially circular throttle valve 13 may be removably attached to the throttle shaft 2 and may disposed within the air intake passage 1a. Therefore, when the throttle shaft 2 rotates, the throttle valve 13 will open and close the air intake passage 1a so as to control the flow of the air within the air intake passage 1a. The throttle valve 13 and the opening of the air intake passage 1a are not limited to a circular shape. For example, the throttle valve 13 and the opening of the air intake passage 1a may have a variety of shapes, such as elliptical.

A gear housing 1e may be formed integrally with the throttle body 1 and may be disposed on one side (left side as viewed in FIG. 1) of the throttle body 1 adjacent to the air intake passage 1a. The gear housing 1e may include a recess that opens on the side opposite to the air intake passage 1a. A gear cover 8 may enclose the recess, thereby defining a gear chamber 8a within the gear housing 1e.

A first end of the throttle shaft 2 (left end as viewed in FIG. 1) may extend into the gear housing 1e via a boss portion 1b that is defined on the throttle body 1. The throttle shaft 2 may include an engaging shaft portion 2a and a small diameter portion 2b that may be formed integrally with the throttle shaft 2 and may have the same axis as the throttle shaft 2. The engaging shaft portion 2a may extend from the first end of the throttle shaft 2 and may have, e.g., a substantially square cross section. A throttle gear 5 may preferably be a sector gear and may engage the engaging shaft portion 2a, so that the throttle shaft 2 rotates with the throttle gear 5. The small diameter shaft portion 2b may extend from the engaging shaft portion 2a and may extend through the gear cover 8.

A motor case 1c may be formed integrally with the throttle body 1 and may be disposed on the upper side of the throttle body 1. The motor case 1c may define a motor-receiving space that has a right end and a left end as viewed in FIG. 1. The right end of the motor-receiving space is preferably closed and the left end of the motor-receiving space preferably opens into the gear chamber 8a. However, this arrangement may naturally be reversed or otherwise modified. A motor 3, e.g. a DC motor, may be disposed within the motor case 1c. The motor 3 may include an output shaft 3A that extends leftward (as viewed in FIG. 1) from the motor 3. A drive gear 3a may be secured to the output shaft 3A.

The motor 3 may include a motor housing 31 that defines the outer contour or shape of the motor 3. The motor housing 31 may include a mounting flange 31a that is disposed on the left side end of the motor housing 31, as viewed in FIG. 1. The mounting flange 31a may extend or project outwardly in the radial direction of the motor housing 31. The motor housing 31 may include a right end portion 31b that has a smaller diameter than the diameter of the motor housing 31.

Figure 2:
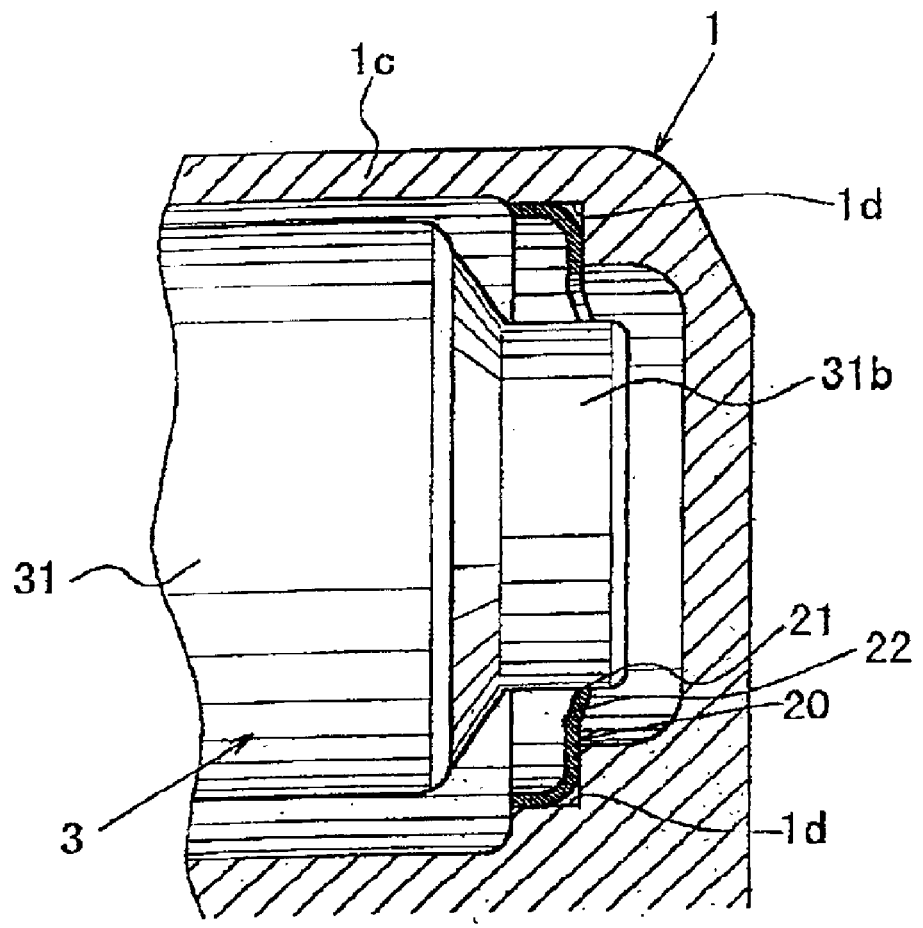
FIG. 2 is an enlarged view of a portion of FIG. 1.

Prior to inserting the motor 3 into the motor case 1c, a support member 20 may be disposed within the motor-receiving space of the motor case 1c. As shown in FIG. 2, the right side of the motor-receiving space may include a stepped circular recess 1d that has a smaller diameter than the diameter of the remaining motor-receiving space.

Figure 3:
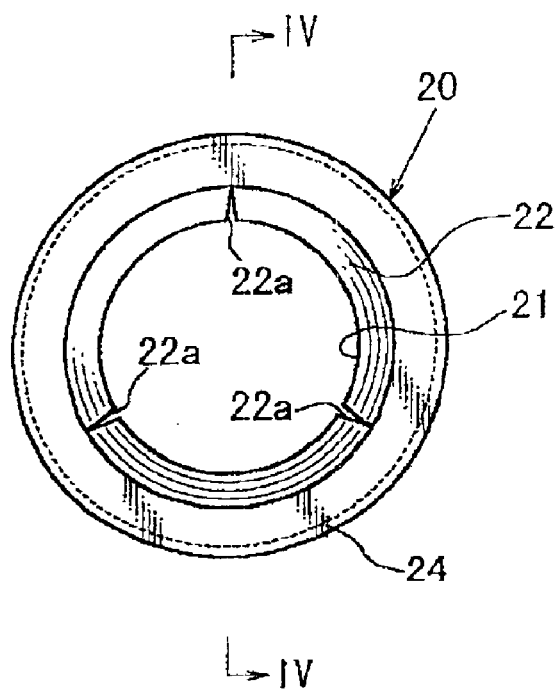
FIG. 3 is a front view of a first representative support member.
Figure 4:
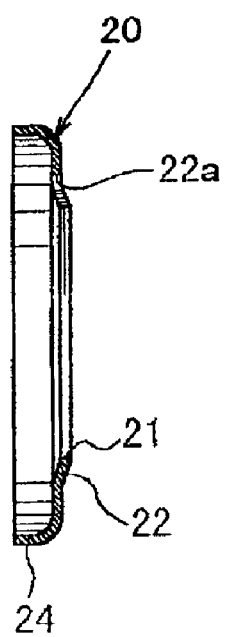
FIG. 4 is a cross-sectional view taken along line IV—IV shown in FIG. 3.

As shown in FIGS. 3 and 4, the representative support member 20 may have a substantially flat ring-shaped configuration. In one aspect of the present teachings, the representative support member 20 may be formed by bending or squeezing a flat ring that is made of metal, such as steel or copper. The metal preferably has relatively high heat conductivity and appropriate elasticity. For example, SK 5 (spring steel) or SUS (stainless steel) may be advantageously utilized to form the support member 20. To the contrary, known throttle bodies have not utilized such support members. Preferably, the support member 20 may have a heat conductivity that is higher or greater than heat conductivity by air. In addition, the support member 20 is preferably made of a metal material that has higher heat conductivity than synthetic resin or rubber materials.

The support member 20 may include a substantially circular concentric support hole 21 that has an inner edge 22. An appropriate number of notches 22a (e.g., three notches in this representative embodiment) may be defined within the inner edge 22 at regular intervals in the circumferential direction. The notches 22a may extend from the support hole 21 in the radial direction of the support member 20. By providing the notches 22a, the inner edge 22 can resiliently deform in order to increase or decrease the inner diameter of the inner edge 22. Further, the inner edge 22 may be bent by an appropriate angle with respect to the axial direction (right direction as viewed in FIG. 4) of the support member 20. The diameter of the support hole 21 preferably may be slightly smaller than an outer diameter of the right end portion 31b of the motor 3.

In addition, the support member 20 may include a fitting edge 24 disposed along the outer periphery of the support member 20 and the fitting edge 24 may have a substantially cylindrical configuration. Preferably, the outer diameter of the fitting edge 24 may be slightly greater than the inner diameter of a larger diameter portion of the stepped circular recess 1d at the bottom of the inner space of the motor case 1c.

The support member 20 may be fitted into the large diameter portion of the stepped circular recess 1d as shown in FIG. 2. In that case, the fitting edge 24 may be press-fitted into the large diameter portion of the stepped circular recess 1d. Thus, the support member 20 can be mounted within the motor case 1c in this representative manner.

The motor 3 may then be inserted into the motor case 1c. For example, the right end portion 31b of the motor housing 31 may be forcibly inserted into the support hole 21 while the inner edge 22 resiliently deforms so as to increase its diameter. In this case, the right end portion 31b of the motor 31 will be reliably supported by the motor case 1c via the support member 20. In the mounted state, the support member 20 may extend substantially radially from the right end portion 31b of the motor 31.

Figure 5:
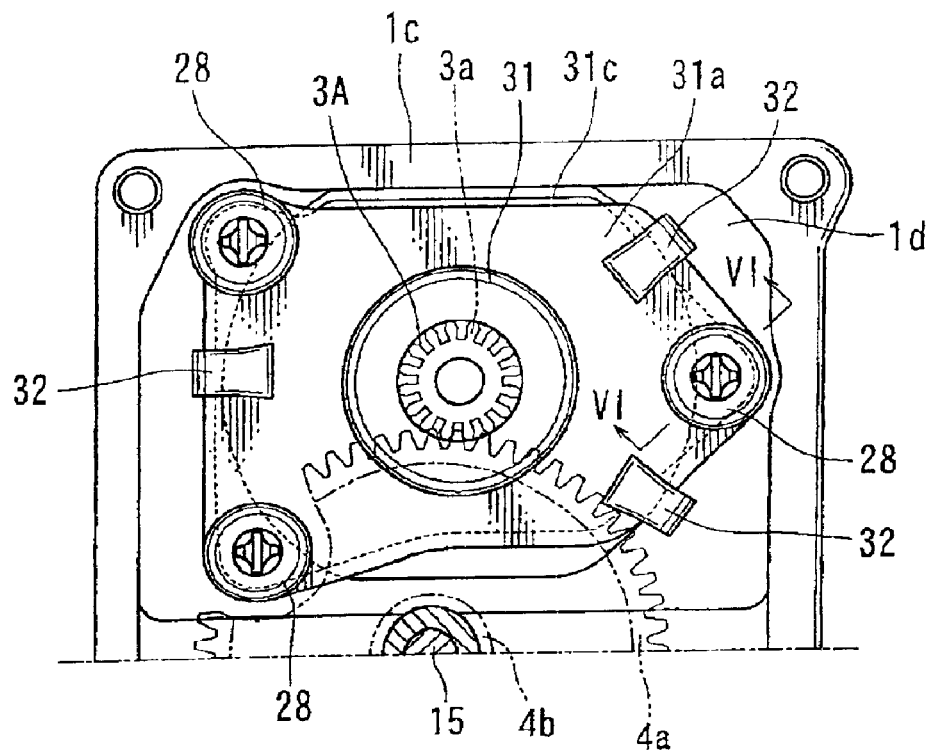
FIG. 5 is a cross-sectional view taken along line V—V shown in FIG. 1.
Figure 6:
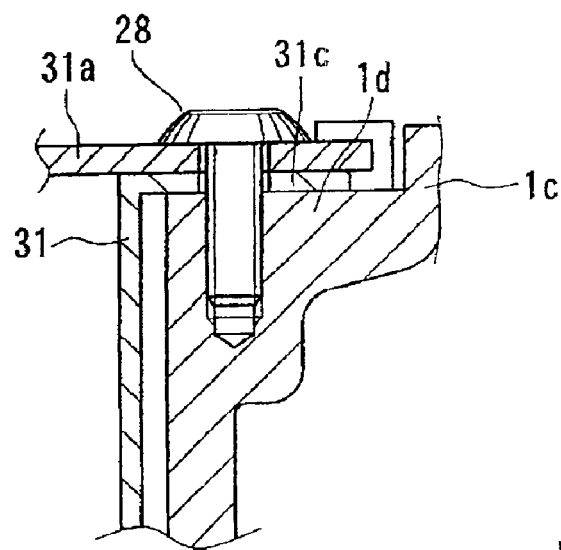
FIG. 6 is a cross-sectional view taken along line VI—VI shown in FIG. 5.

Thereafter, the mounting flange 31a may be secured to the open end of the motor case 1c by screws 28. For example, as shown in FIGS. 5 and 6, the motor case 31 may include a support flange 31c that is formed with the left side end of the motor housing 31 and extends outward from the left side end in the diametrical direction of the motor housing 31. The support flange 31c may include claws 32 that are formed integrally with the peripheral portion of the support flange 31c. The claws 32 may be bent to clamp and retain the mounting flange 31a. As shown in FIG. 6, the screws 28 may be inserted into corresponding insertion holes formed through the mounting flange 31a and the support flange 31c. Further, the screws 28 may engage a stepped wall 1d formed on the peripheral portion of the left side end (upper end as viewed in FIG. 6) of the motor case 1c. As a result, the left side end of the motor housing 31 may be fixed in position relative to the motor case 1c both in the axial direction (longitudinal direction) and the diametrical direction.

Referring back to FIG. 1, a counter shaft 15 may be fixedly mounted within the gear chamber 8a and may extend between the throttle body 1 and the gear cover 8. A counter gear 4 may be disposed within the gear chamber 8a and may be rotatably supported by the counter shaft 15. The counter gear 4 may include a large gear portion 4a that engages the drive gear 3a and a small gear portion 4b that engages the throttle gear 5.

The motor 3 may be electrically connected to a control circuit (not shown) that outputs drive signals to the motor 3 in response to the condition of an engine, e.g. a vehicle engine. Such control circuits are well known in the art and need not be described in detail herein, as a variety of control circuits may be advantageously utilized with the present teachings. When the drive signals are outputted by the control circuit in order to drive the motor 3, the rotation of the motor 3 is transmitted to the throttle shaft 2 via the drive gear 3a, the counter gear 4 and the throttle gear 5. Therefore, the throttle valve 13 may be actuated in order to open and close the air intake passage 1a in this manner. However, a variety of actuation means for use with the throttle valve 13 may be utilized with the present teachings.

A relief lever 9 also may be disposed within the gear chamber 8a and may be rotatably supported by the throttle shaft 2. A return spring 11 (e.g., a coil spring) may couple the relief lever 9 to the throttle body 1 so as to bias the relief lever 9 towards the closing direction of the throttle valve 13 relative to the intake air passage 1a. A relief spring 10 may couple the relief lever 9 to the throttle gear 5 so as to bias the throttle gear 5 towards the opening direction of the throttle valve 13 relative to the intake air passage 1a. The relief lever 9 normally engages the throttle gear 5 due to the respective biasing forces of the return spring 11 and the relief spring 10. The relief lever 9 and the associated springs 10 and 11 need not be described in detail herein, because these parts are well known in the art.

A sensor housing 8b may be defined by the gear cover 8 and may be disposed on the lower portion of the gear cover 8 as viewed in FIG. 1. The sensor housing 8b may include an opening on the left side as viewed in FIG. 1, which opening may be closed or covered by a sensor cover 16. A circuit board 7 may be mounted within the sensor housing 8b. Various electronic elements may be mounted on the circuit board 7 so as to configure a sensor circuit. A sensor lever 6 also may be disposed within the sensor housing 8b and may be secured to the small diameter shaft portion 2b of the throttle shaft 2. The sensor lever 6 and the sensor circuit on the circuit board 7 may cooperate to define a throttle sensor that may serve to detect the degree of opening of the throttle valve 13. The control circuit may utilize this position information in order to generate appropriate drive signal for the motor 3.

A representative method for operating the above representative throttle device will now be described. When the engine is started, the control circuit may output drive signals to the motor 3. In this case, the motor 3 will be driven and as a result, the motor 3 will indirectly control the degree of opening of the throttle valve 13 via the valve actuation means (e.g., the drive gear 3a, the counter gear 4 and the throttle gear 5). Therefore, the flow of intake air into the air intake passage 1a may be adjusted in response to the engine condition.

Because the motor 3 is supported within the throttle body 1 in a straddle manner from both sides in the longitudinal direction of the motor, any vibrations that may received by the motor 3 along the diametrical direction of the motor can be dampened, in particular at the right end portion 31b. Therefore, the motor 3 can be prevented from vibrating or from substantially vibrating and thereby generating unwanted noises.

In addition, the right end portion 31b of the motor 3 may be supported by the motor case 1c of the throttle body 1 via the support member 20, as was further described above. Therefore, the right end portion 31b may be reliably prevented from deforming when the motor 3 is mounted within the motor case 1c. Consequently, the present teachings according to this representative embodiment can eliminate possible defects that may be caused by such deformation of the motor 3. In fact, if the end portion 31b is directly supported by the motor case 1c, the end portion 31b will be required to be press-fitted within the motor case 1c. Generally speaking, the rigidity of the motor case 1c is higher or greater than the rigidity of the end portion 31b of the motor 3. Therefore, during the press-fitting operation, the end portion 31b will deform to a greater extent than the motor case 1c. If the end portion 31b deforms, the output shaft 3A may be locked or may not properly rotate during operation.

Further, if the support member 20 is made of a material having relatively high heat conductivity, heat generated by the motor 3 may be effectively conducted to the throttle body 1 and then may be dissipated to the surrounding environment. Therefore, the motor 3 can be effectively cooled during operation and overheating of the motor 3 can be avoided.

If the support member 20 is formed as a leaf spring, the support member 20 may reliably retain is shape during extended operation, as compared to known support members that are made of rubber. Therefore, the motor 3 can be reliably prevented from vibrating, even during extended operation of the throttle device.

Moreover, the support member 20 may be arranged and configured to support the end portion 31b of the motor 3 in a manner similar to a vertical flat plate that extends outward from the motor in the diametrical direction. In this case, the support member 20 can reliably support the motor 3 while providing relatively great or high rigidity in the diametrical direction of the motor 3. In addition, the support member 20 thus arranged will typically occupy a relatively small space within the motor case 1c along the axial direction of the motor 3.

The end portion 31b of the motor 3 may be fitted into the support member 20 and the support member 20 may be bent so as to resiliently deform only at the inner edge 22. Therefore, the end portion 31b can be easily moved into position in order to be supported by the support member 20. Preferably, the support member 20 may be relatively rigid along the diametrical direction.

In addition, if the support member 20 is adapted to be press-fitted into the motor case 1c, the support member 20 can be easily mounted within the throttle body 1.

Figure 7:
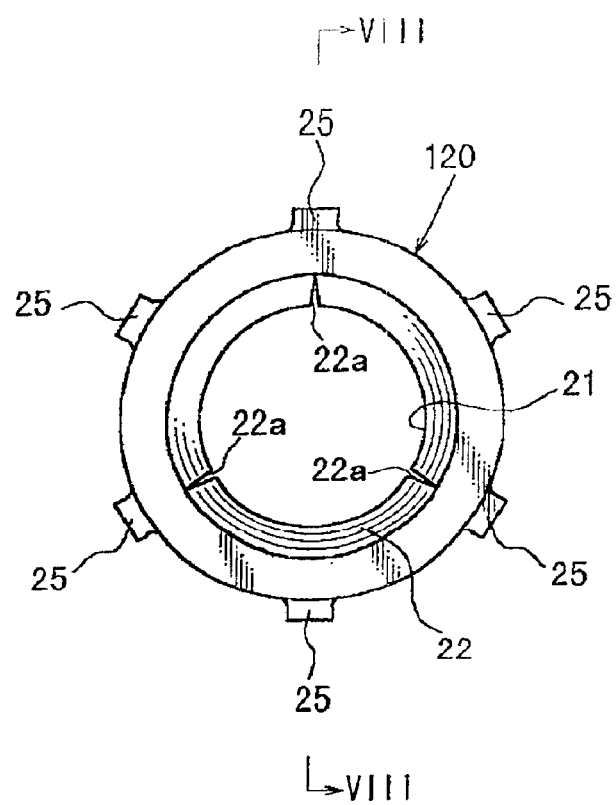
FIG. 7 is a front view of a second representative support member.
Figure 8:
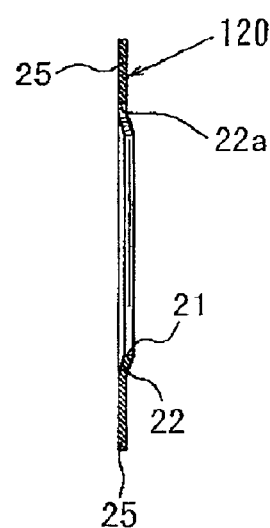
FIG. 8 is a cross-sectional view taken along line VIII—VIII shown in FIG. 7.

A second representative support member will now be described with reference to FIGS. 7 and 8, which respectively show a front view of a support member 120 and a cross sectional view of the support member 120 taken along line VIII—VIII in FIG. 7. The same elements that were described above in the support member 20 will be given the same reference numerals and therefore, further description of these above-described elements may be omitted. Furthermore, the support member 120 shown in FIGS. 7 and 8 may be utilized in the throttle device shown in FIG. 1. Therefore, it is not necessary to further describe a representative throttle device for use with the support member 120.

Instead of the fitting edge 24 of the first representative support member 20, the second representative support member 120 may include a plurality of fitting projections 25 that extend radially outward from the peripheral portion of the support member 120. Although the number of the fitting projections 25 may be suitably determined on a case-by-case basis, six fitting projections 25 are shown in FIG. 7 for purposes of illustration. The fitting projections 25 are preferably bent so as to resiliently or elastically deform.

The support member 120 may be fitted into the large diameter portion of the stepped circular recess 1d in the same way as the first representative support member 20. Thus, the fitting projections 25 may resiliently bend when the support member 120 is fitted into the large diameter portion of the stepped circular recess id. Therefore, the support member 120 can be reliably mounted within the motor case 1c.

The second representative support member 120 may provide substantially the same operation and effects as the first representative support member 20. For example, the fitting projections 25 may facilitate fitting the support member 120 within the motor case 1c, because the fitting projections 25 can be easily bent to deform.

The present invention is not limited to the above-described representative embodiments. In fact, the above-representative embodiments may be modified in various ways without departing from the present teachings. For example, the motor case 1c may be eliminated and the support member 20(120) may be mounted directly within the throttle body 1. In addition, the support member 20(120) may be formed in a variety of configurations (i.e., in addition to the leaf spring configuration) as long as the support member provides vibration-damping support and/or reliable heat conductivity. Further, the support member 20(120) may be mounted onto the end portion 31b prior to the fitting into the motor case 1c. In the alternative, the support member 20(120) may be formed integrally with a portion of the end portion 31b. Furthermore, the support member 20(120) may support a main portion of the motor housing 31 instead of only the end portion 31b.

Finally, other useful teachings, which may be advantageously combined with the present teachings, can be found in U.S. Pat. Nos. 5,906,185, 6,047,672, 6,070,458, 6,116, 214, 6,138,640, 6,153,952, 6,164,623, 6,320,285, 6,349,701 and 6,367,773, all of which are incorporated herein by reference as if fully set forth herein.

What is claimed is:

1. An apparatus comprising: a throttle body defining an air intake passage, a throttle valve arranged and constructed to open and close the air intake passage; a motor arranged and constructed to rotatably drive the throttle valve; a first support arranged and constructed to support a first side of the motor in a longitudinal direction of the motor, wherein the first side of the motor is fixed in position both in a longitudinal direction and a diametrical direction of the motor; and a second support arranged and constructed to resiliently and elastically support a second side of the motor in the longitudinal direction of the motor, wherein the second support comprises a ring that includes a first fitting portion defined on an inner periphery of the ring and a second fitting portion defined on an outer periphery of the ring, the first fitting portion contacting the motor and the second fitting portion contacting the throttle body, and wherein the first fitting portion includes notches formed at regular intervals around the inner periphery of the ring and the inner periphery has a diameter that is slightly smaller than a diameter of a portion of the motor that contacts the second support, wherein the first fitting portion is resiliently and elastically fitted onto the motor.

2. An apparatus comprising: a throttle body defining an air intake passage; a throttle valve arranged and constructed to open and close the air intake passage; a motor arranged and constructed to rotatably drive the throttle valve; a first support arranged and constructed to support a first side of the motor in a longitudinal direction of the motor, wherein the first side of the motor is fixed in position both in a longitudinal direction and a diametrical direction of the motor; and a second support arranged and constructed to resiliently and elastically support a second side of the motor in the longitudinal direction of the motor, wherein the second support comprises a ring that includes a first fitting portion defined on an inner periphery of the ring and a second fitting portion defined on an outer periphery of the ring, the first fitting portion contacting the motor and the second fitting portion contacting the throttle body, and wherein the second fitting portion is bent so as to have a substantially cylindrical configuration with a circumferential wall, and wherein the second fitting portion is fitted into the throttle body and the circumferential wall of the second fitting portion is pressed against an inner wall of the throttle body.

3. An apparatus comprising: a throttle body defining an air intake passage; a throttle valve arranged and constructed to open and close the air intake passage; a motor arranged and constructed to rotatably drive the throttle valve; a first support arranged and constructed to support a first side of the motor in a longitudinal direction of the motor, wherein the first side of the motor is fixed in position both in a longitudinal direction and a diametrical direction of the motor; and a second support arranged and constructed to resiliently and elastically support a second side of the motor in the longitudinal direction of the motor, wherein the second support comprises a ring that includes a first fitting portion defined on an inner periphery of the ring and a second fitting portion defined on an outer periphery of the ring, the first fitting portion contacting the motor and the second fitting portion contacting the throttle body, and wherein the second fitting portion comprises a plurality of projections, wherein the projections are disposed at regular intervals around the periphery of the second support, the projections extend in the radial direction of the ring, and the projections are resiliently and elastically bent along the axial direction of the motor so as to press against an inner wall of the throttle body.

4. An apparatus as in claim 1, wherein the second support is formed from a metal plate.

5. An apparatus as in claim 4, wherein the metal plate comprises stainless steel.

6. An apparatus as in claim 4, wherein the metal plate comprises spring steel.

7. An apparatus as in claim 1, wherein the second support comprises a metallic leaf spring.

8. An apparatus as in claim 2, wherein the second support is formed from a metal plate.

9. An apparatus as in claim 2, wherein the metal plate comprises stainless steel.

10. An apparatus as in claim 2, wherein the metal plate comprises spring steel.

11. An apparatus as in claim 2, wherein the second support comprises a metallic leaf spring.

12. An apparatus as in claim 3, wherein the second support is formed from a metal plate.

13. An apparatus as in claim 3, wherein the metal plate comprises stainless steel.

14. An apparatus as in claim 3, wherein the metal plate comprises spring steel.

15. An apparatus as in claim 3, wherein the second support comprises a metallic leaf spring.

* * * * *